United States Patent [19]
Cattaneo

[11] Patent Number: 6,026,707
[45] Date of Patent: *Feb. 22, 2000

[54] MOTOR VEHICLE STEERING WHEEL PROVIDED WITH AIR BAG PROTECTION DEVICE

[75] Inventor: Marco Cattaneo, Pavia, Italy

[73] Assignee: Breed Automotive Technology, Inc., Lakeland, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/616,810

[22] Filed: Mar. 15, 1996

[30] Foreign Application Priority Data

Mar. 16, 1995 [IT] Italy ................................ MI950181 U

[51] Int. Cl.⁷ ........................... B62D 1/04; B60R 21/22
[52] U.S. Cl. ........................................... 74/552; 280/731
[58] Field of Search ..................... 74/552; 280/728.2, 280/731, 728.1, 729, 730.1, 732, 734; D12/176

[56] References Cited

U.S. PATENT DOCUMENTS

| | | | |
|---|---|---|---|
| D. 311,369 | 10/1990 | Whitley | D12/176 |
| D. 347,820 | 6/1994 | Plymale | D12/176 |
| 3,827,715 | 8/1974 | Lynch | 280/150 |
| 4,280,372 | 7/1981 | Van Wicklin | 74/552 |
| 4,828,286 | 5/1989 | Fohl | 280/731 |
| 4,884,823 | 12/1989 | Honda | 280/731 |
| 4,960,292 | 10/1990 | Sadler | 280/731 |
| 5,024,464 | 6/1991 | Kawaguchi et al. | 280/731 |
| 5,222,415 | 6/1993 | Fujita et al. | 74/552 |
| 5,228,362 | 7/1993 | Chen et al. | 74/552 |
| 5,257,816 | 11/1993 | Sugimoto et al. | 280/735 |
| 5,267,486 | 12/1993 | Niwa et al. | 74/552 |
| 5,310,218 | 5/1994 | Miyoshi et al. | 74/552 |
| 5,333,897 | 8/1994 | Landis et al. | 280/728 |
| 5,356,173 | 10/1994 | Hongou et al. | 74/552 |
| 5,419,585 | 5/1995 | Breed et al. | 280/731 |
| 5,470,099 | 11/1995 | Williams | 280/728.2 |
| 5,584,501 | 12/1996 | Walters | 280/728.2 |

FOREIGN PATENT DOCUMENTS

| | | | |
|---|---|---|---|
| 22679 | 1/1981 | European Pat. Off. . | |
| 0 648 661 | 4/1995 | European Pat. Off. . | |
| 1048176 | 12/1953 | France . | |
| 3426684 A1 | 1/1985 | Germany | 74/552 |
| 3925761 | 2/1990 | Germany . | |
| 58-53561 | 3/1983 | Japan | 74/552 |
| 59-14573 | 1/1984 | Japan | 74/552 |
| 5-8735 | 1/1993 | Japan | 74/552 |
| 6-1246 | 1/1994 | Japan | 74/552 |
| 7-329790 | 12/1995 | Japan . | |
| 383072 | 11/1932 | United Kingdom | 74/552 |
| WO 94/11230 | 5/1994 | WIPO | 74/552 |

OTHER PUBLICATIONS

English Abstract of German DE 3426684 A, Jan. 31, 1985, Derwent Publications Ltd.

Patent Abstracts of Japan, vol. 95, No. 012 & JP–A–07 329790 (Sensor Technol KK), Dec. 19, 1995.

Primary Examiner—Vinh T. Luong
Attorney, Agent, or Firm—Nixon & Vanderhye, P.C.

[57] ABSTRACT

A steering wheel for motor vehicles provided with an air bag protection device comprises a central part including a hub for connecting to a steering wheel coupling and a cavity for housing an air bag protection device, an external crown and a plurality of substantially radial spokes for connecting the external crown to the central part of the steering wheel. The hub is constructed as a structural part distinct from said spokes and is releasably fastened to them and has at least one pair of ears for the releasable fastening of the air bag device.

2 Claims, 3 Drawing Sheets

MOTOR VEHICLE STEERING WHEEL PROVIDED WITH AIR BAG PROTECTION DEVICE

BACKGROUND

I. Field of the Invention

The present invention relates to a steering wheel for motor vehicles provided with an air bag protection device.

II. Related Art and Other Considerations

The use of air bag devices for the protection of the chest of the driver of a motor vehicle in case of a violent impact against an obstacle is now widespread.

Essentially an air bag protection device is a prefabricated module that is applied to the central part of the steering wheel and contains an explosive charge that inflates on impact to cause the rupture of an external container and the inflation of a balloon or bag that is interposed between the driver and the steering wheel in front.

The increasingly frequent use of air bag devices has created a problem for the manufacturers of steering wheels, in particular those of higher value, that are not applied to the usual mass-produced cars but are very frequently purchased as separate accessories and mounted in place of those normally supplied.

The problem is that, by varying the type of steering wheel coupling on the steering wheel column, as well as the type of air bag incorporated in the steering wheel, it is practically necessary to make a different steering wheel for each manufacturer of motor vehicles, if not even for every model of motor vehicle.

In addition, the request for a steering wheel with a different shape or with a different air bag device inevitably involves the replacement of the entire steering wheel with corresponding costs.

In view of this state of the art and of the abovementioned problems, the object of the present invention has been that of providing a steering wheel for motor vehicles with an air bag protection device, that is readily adaptable to different types of steering wheel couplings and is at the same time capable of receiving air bag devices that are also of different types.

SUMMARY

According to the invention such object has been attained with a steering wheel for motor vehicles, comprising a central part including a hub connecting to a steering wheel coupling and a cavity for housing an air bag protection device, an external crown and a plurality of substantially radial spokes for connecting the external crown to the central part of the steering wheel, characterized in that said hub is constructed as a structural part distinct from said spokes and is releasably fastened to them and has at least one pair of ears for the releasable fastening of the air bag device.

In this way, without having to replace the entire steering wheel, the steering wheel itself can be adapted to a different coupling through the simple replacement of the hub, or the crown with the corresponding spokes can be replaced while keeping the same hub, or again the air bag device can be replaced with another one of a different type.

The final result is undoubtedly favorable for steering wheel manufacturers, who do not, on different occasions, have to stock or manufacture many different steering wheels.

BRIEF DESCRIPTION OF THE DRAWINGS

The features of the present invention will be made more clear by the following detailed description of an embodiment thereof illustrated as an example in the enclosed drawings, wherein.

DESCRIPTION OF THE PREFERRED EMBODIMENTS

Figure 1:
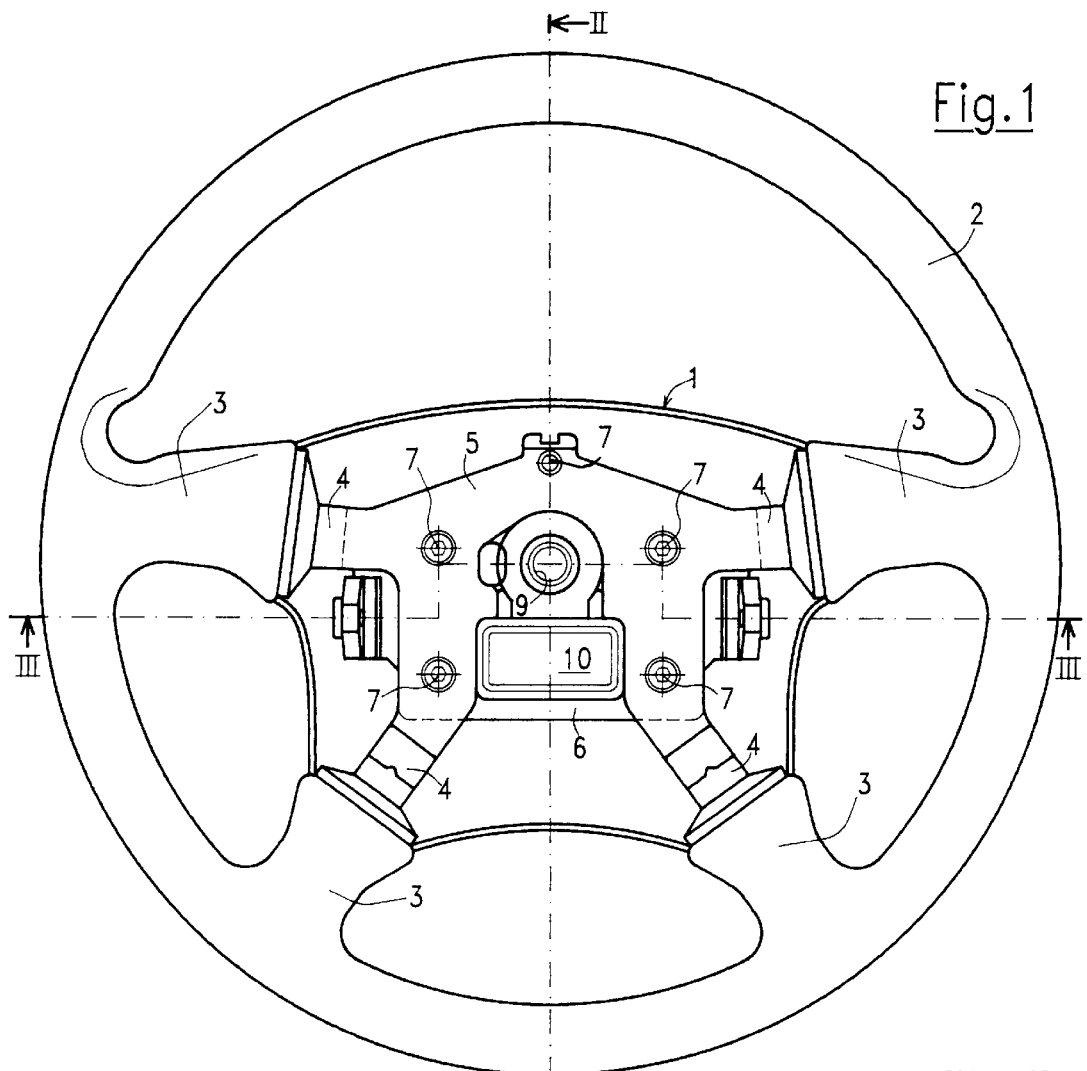
FIG. 1 shows a steering wheel according to the invention in a top plan view with air bag and corresponding cover removed so as to show the inside of the central part of the steering wheel.

There are shown in the drawings a steering wheel consisting essentially of a central part 1, of an external crown 2 and of four essentially radial spokes 3 arranged so as to connect the central part 1 to the crown 2.

The spokes 3 are integral with the crown 2 and have thin metal cores 4 internally, connected together thanks to a U-shaped plate 5 (FIG. 1) axially displaced with respect to the crown 2 so as to define a cavity 15 (FIGS. 2 and 3) inside the tub-shaped casing 16 of the central part 1.

The plate 5 is in turn placed above or, as an alternative, below a hub 6 to which it is fastened by means of threaded screws or grub screws 7 (FIG. 1).

Figure 3:
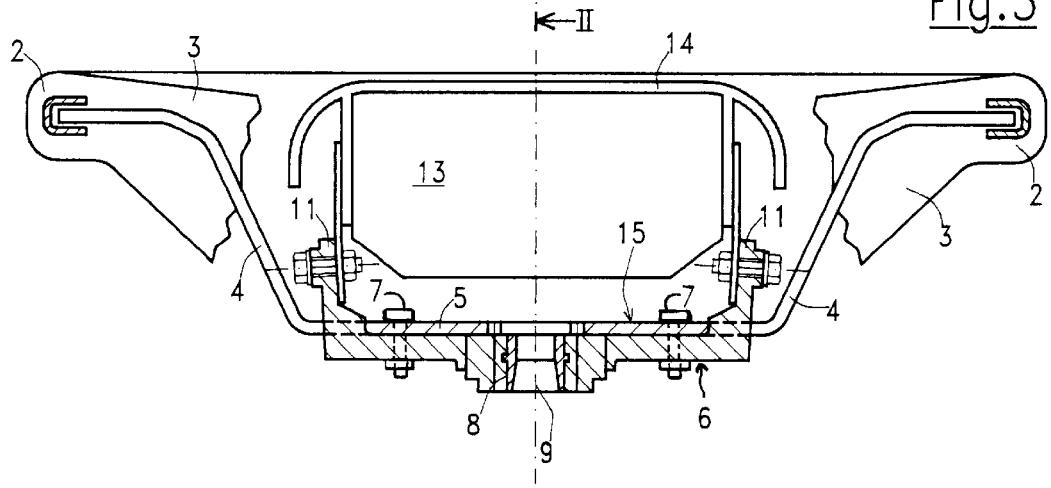
FIG. 3 shows the abovementioned steering wheel in a cross-sectional view taken along the line III—III of FIG. 1, this time with air bag and corresponding cover applied.
Figure 4:
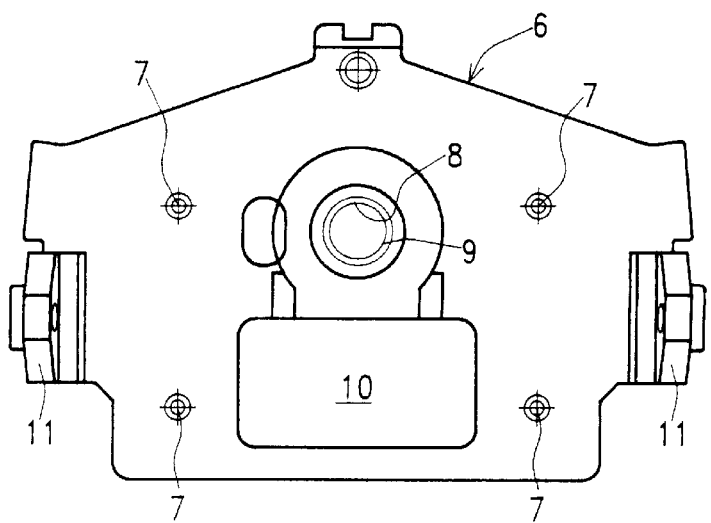
FIG. 4 shows the detail of the hub of the steering wheel in a plan view from above.
Figure 3A:
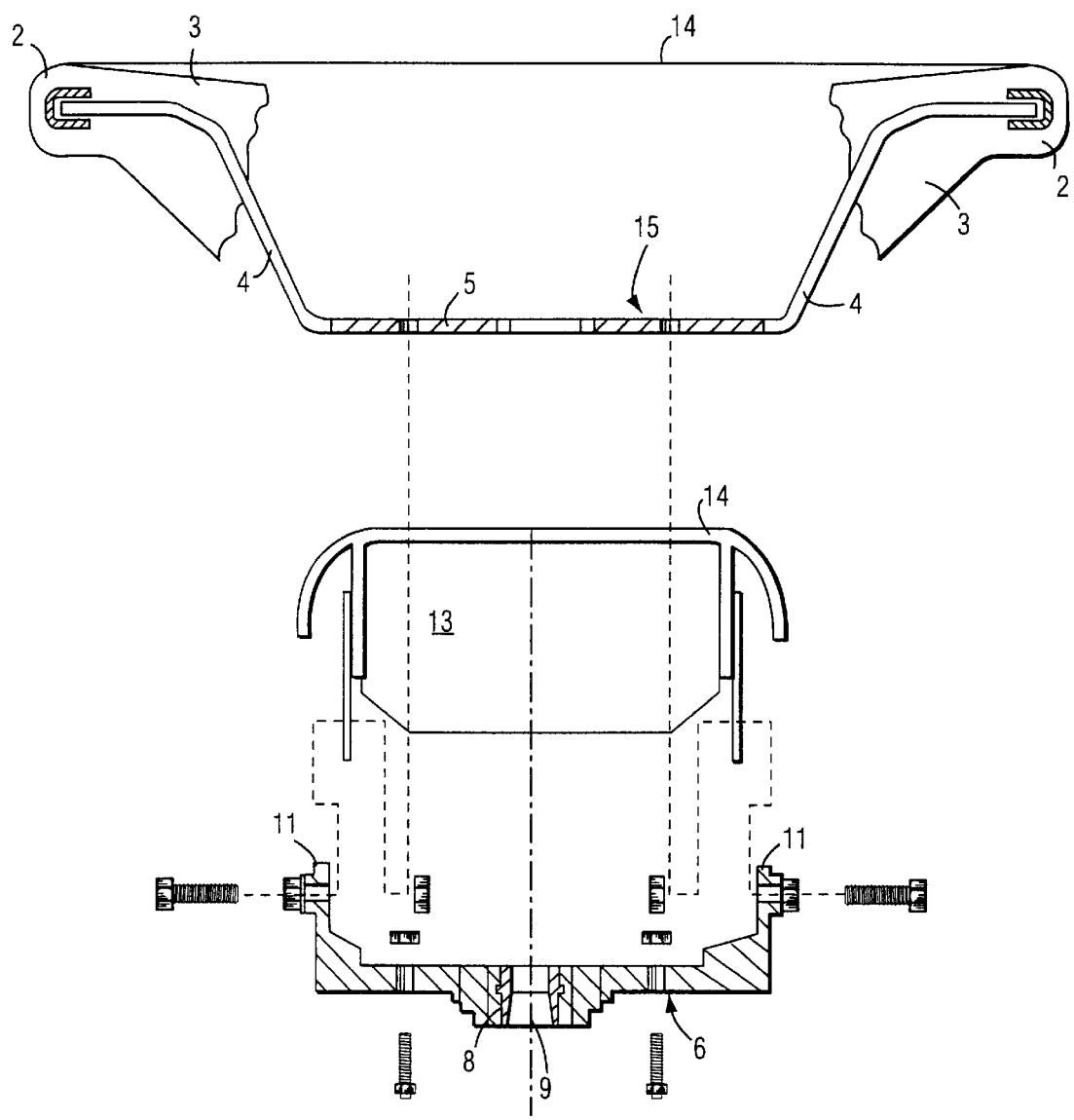
FIG. 3A shows the abovementioned steering wheel in a cross-sectional exploded view taken along the line III—III of FIG. 1, showing a detached hub and an air bag device detachable from the hub.

The hub 6 has the shape shown in FIG. 4 and has in particular a central hole 8 internally lined with a grooved bushing 9 (FIGS. 2 and 3) [also known as a steering wheel coupling] suitable for the rotational coupling to a corresponding terminal portion of the column of the steering wheel of a motor vehicle.

The hub 6 also has a rectangular hole 10 suitable for the passage of electrical conductors (not shown).

Figure 2:
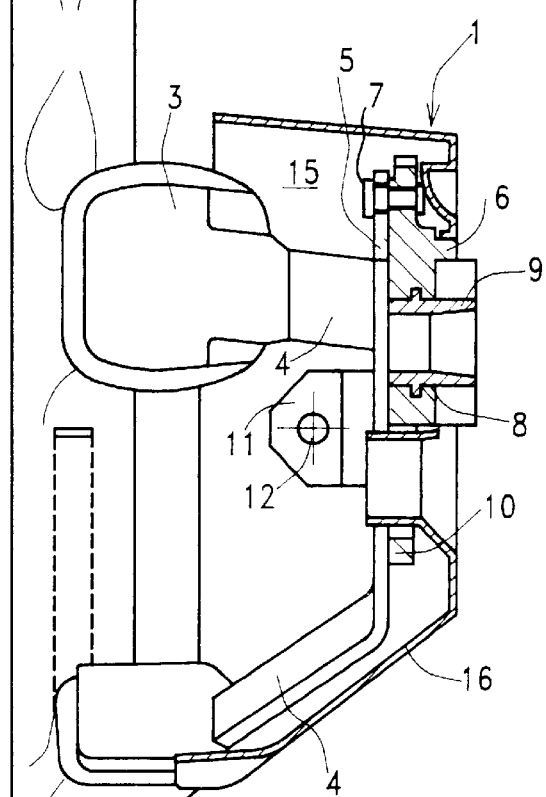
FIG. 2 shows the abovementioned steering wheel in a cross-sectional view taken along the line II—II of FIG. 1, still without air bag device and corresponding cover.

As shown in FIGS. 1, 2 and 3 the hub 6 is provided with two turned-down ears 11 provided with holes 12 for the releasable fastening of any air bag device 13, that is illustrated diagrammatically in FIG. 3 and is closed in its upper part by a cover 14 that completes the central part of the steering wheel in a suitable manner, filling the cavity 15.

It is evident that the design of the hub 6 as a distinct and removable piece fastened to the remainder of the steering wheel and the presence of the ears 11 for fastening the air bag device make it possible to use the same steering wheel with a different hub, suitable for fastening to different steering columns and thus to different motor vehicles, as well as the replacement of the remaining part of the steering wheel while leaving the central hub unchanged, as well as lastly the replacement of the air bag device with another of a different type or brand.

I claim:

1. A combination of a steering wheel for motor vehicles and an air bag device the combination comprising:

an external crown defining a first plane;

a central plate arranged in a second plane parallel to the first plane;

a plurality of substantially radial spokes for connecting the external crown to the central plate and defining a cavity between the first plane and the second plane in front of the central plate, the cavity having the air bag device housed therein;

a hub which is structurally distinct from said plate and said spokes, the hub being releaseably fastened to a back side of the central plate, the hub having at least one pair of ears protruding into said cavity, the air bag device being removably attached to the pair of ears.

2. The combination of claim 1, wherein the central plate is axially displaced with respect to said crown so as to define the cavity, the cavity being sized to accommodate the air bag device.

* * * * *